Patented Feb. 13, 1951

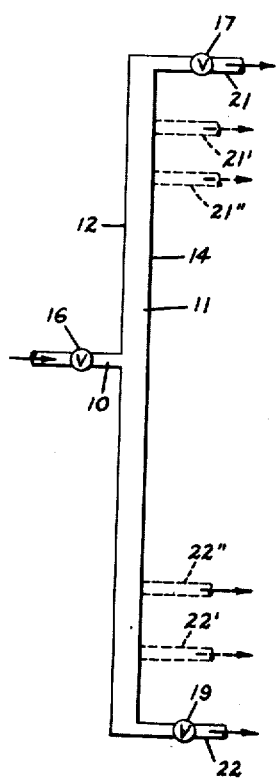
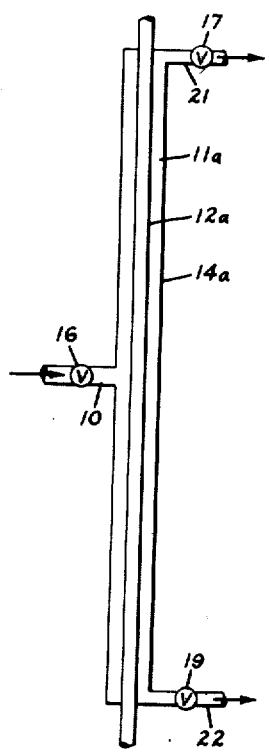
INVENTORS.
ARTHUR LETCHER JON
EVERETT C. HUGHES
THEIR ATTOR*

2,541,070

UNITED STATES PATENT OFFICE 2,541,070

METHOD OF SEPARATING DISSIMILAR COMPONENTS IN PETROLEUM PRODUCTS BY LIQUID THERMAL DIFFUSION

Arthur Letcher Jones, Cleveland, and Everett C. Hughes, Cleveland Heights, Ohio, assignors to The Standard Oil Company, Cleveland, Ohio, a corporation of Ohio Application July 11, 1947, Serial No. 760,350

3 Claims. (Cl. 196—1)

The present invention relates to a method of separating, by continuous thermal diffusion, dissimilar components in petroleum products while said products are in the liquid or liquefied state.

The term "dissimilar components" is used broadly in the present specification and the appended claims and is intended to refer to two or more components in or of a liquid or liquefiable petroleum product. These components may be dissolved in a common solvent, they may be liquid components of a mixture, or one of the components may be a solvent and another the solute. The difference between the dissimilar components may be almost imperceptible. Thus, for example, they may have the same empirical formula but differ slightly in structure or molecular weight, or they may differ in color, density or viscosity. Examples of dissimilar components that come within the scope of this term as it is used hereinafter and which are extremely difficult to separate by ordinary distillation methods, are 1-methyl naphthalene and 2-methyl naphthalene, ortho xylene and para xylene, the light and dark components of sulfurized cutting oils and the waxy and non-waxy components of lubricating oils.

The term "separation," as used hereinafter, is intended to include not only separation in the ordinary sense of the word but also concentration, enrichment, rectification and purification. Thus, for example, the "separation of dissimilar components" includes the separation into two fractions of a petroleum product containing heptane and iso-octane, one fraction containing a higher concentration of heptane and the other fraction containing a higher concentration of iso-octane than the initial petroleum product; the separation of mono-methyl naphthalene into its alpha and beta isomers; the separation or purification of sulfur cutting oils into two fractions, one of which has a substantially lighter color than the other fraction and the initial cutting oil; as well as the refining of petroleum oils.

The term "petroleum product," as used in the present specification and the appended claims, is intended to include not only hydrocarbons as such but also hydrocarbons containing minor amounts of added or naturally occurring compounds containing nitrogen, oxygen and sulfur. Methods hitherto used in the petroleum industry to separate dissimilar components include fractional distillation, solvent extraction with liquids such as methyl ethyl ketone, furfural, liquid sulfur dioxide and phenol, extractive distillation and adsorption processes such as adsorption on clay or silica gel. While these are used widely in the petroleum industry, they each have limitations that are disadvantageous. Thus, for example, fractional distillation fails, or at least becomes impracticable, when it is desired to separate components that have the same or very nearly the same boiling points, e. g., in the normal butane and 2-butene. While the separation of such components may be theoretically possible in a fractionating tower, it is not practical for the reason that the boiling points of these two substances, which are both present in the same petroleum products, are very close together. Solvent extraction methods have the disadvantage of requiring the use of a chemical that must either be available in large volumes or must be continuously subjected to purification. Separation systems employing clay or silica gel as an adsorption agent must be dismantled from time to time to clean out the adsorption tower and recharge it with the adsorbing substance.

The method of this invention comprises subjecting a petroleum product in liquid or liquefied form to continuous thermal diffusion by maintaining a temperature gradient across a substantially uniform, thin stream of the product by adding heat to one face thereof and withdrawing heat from the other face. A fraction that is richer in one component of the product than was the initial product is continuously withdrawn from one part of said stream and another fraction richer in the other or another of the components of the initial product is withdrawn from another part of said stream. This may suitably be accomplished by introducing the liquid or liquefied petroleum product into a substantially uniform narrow slit formed by a hot surface on one side and a cold surface on the other.

The word "slit," as used herein, is intended to refer to a long, thin space between a hot surface and a cold surface, in which space the thermal diffusion is accomplished.

While the present invention is not to be limited by any theory presented herein, it is believed that the phenomenon of liquid thermal diffusion may be explained on the theory that the molecules of one component acquire greater kinetic energy of translation by absorption of heat from the hot surface than do the molecules of the other component and that, as a result, those molecules acquiring the higher kinetic energy of translation will tend to concentrate in a layer of fluid adjacent the cold surface, whereas those acquiring less kinetic energy of translation will tend to concentrate in a layer adjacent the hot surface. If the slit is vertical or has a vertical component, a convection current is also set up by the temperature gradient in the slit so that the liquid adjacent the hot surface will rise and the liquid adjacent the cold surface will descend, with the result that the molecules having greater kinetic energy of translation imparted to them and tending to concentrate next to the cold surface pass downwardly into the lower part of the slit, whereas the molecules having lesser kinetic energy of translation and tending to concentrate adjacent the hot surface will rise into the upper part of the slit.

It has been found, surprisingly, that under optimum conditions it is possible to obtain as great a separation of the dissimilar components or materials in one pass of the feed stock through the slit as by a number of passes as has been done in the batch method wherein the liquid subjected to thermal diffusion is allowed to arrive at a state of equilibrium. In view of this discovery the continuous method was found to be a feasible procedure. This, however, is not intended to exclude retreatment of material of different composition which is obtained after any given pass.

While it is to be understood that it is within the scope of this invention to carry out the desired separation in a horizontal slit and that it is quite possible to withdraw the dissimilar components therefrom without causing them to intermingle appreciably, it is preferred to operate with one or more vertical or nearly vertical slits for the reason that the convection currents set up in such slits can then be utilized to reduce the mechanical difficulties involved in effectively withdrawing the separated dissimilar components on an industrial scale. For this reason, the remainder of the description of this invention is concerned primarily with the embodiment of the method that involves the withdrawal of one fraction from the upper end of a slit and of another fraction from the lower end of the slit.

The method of this invention is preferably carried out in a continuous manner. The initial petroleum product is introduced in the liquid state into a narrow slit at a continuous rate that depends upon a number of interdependent variables that will be discussed more fully hereinafter, and two different fractions are continuously withdrawn from the slit at volumetric rates consistent with the rate of feed.

The prime advantage of the method of this invention is that separations hitherto considered to be impossible or impracticable by other methods, such as fractionation, extractive distillation, adsorption and solvent extraction can be carried out in a manner having commercial utility.

Another advantage of the continuous method of this invention is that it permits exact and complete control over the degree of separation or concentration that is obtained and that it is adaptable to operations on a large scale especially inasmuch as the operation can be carried in a bank of thermal diffusion slits having any desired number of slits connected in parallel for maximum throughput or in a series for maximum separation.

An important advantage of the continuous process is that it can be applied to a large variety of components and is of wide application since it has been demonstrated by experiment, for example that components having the same or very nearly the same boiling point, and even stereo and other isomers having exceedingly similar properties, can be effectively separated by liquid thermal diffusion.

These and other advantages, as well as the objects and utility of the invention will become apparent from the more detailed description that follows hereinafter.

The liquid thermal diffusion process of this invention may be carried out in any suitable apparatus having a narrow slit, a means for introducing the liquid to be rectified into said slit and means for withdrawing the dissimilar fractions from the different parts of said slit. Apparatus of this type may be in the form of concentric tubes, parallel plates, or the like.

Several examples of apparatus suitable for this method are those illustrated schematically in the accompanying drawing wherein:

Figure 1 is a diagrammatic view of an embodiment wherein the slit is formed by a pair of separated plates; and Figure 2 is a diagrammatic view of an embodiment wherein the slit is formed by a pair of concentrically disposed tubes.

The method illustrated schematically in Fig. 1 of the drawing involves introducing the initial liquid petroleum product in any suitable manner, such as through an inlet port 10 into a narrow slit 11 formed by two separated surfaces 12 and 14, one of which is maintained at a higher temperature level than the other. The resultant temperature gradient across the slit 11 causes thermal diffusion to take place in the liquid within the slit so that the portion adjacent the hot surface of the slit, i. e., the portion lying between the hot surface and approximately the center of the slit becomes more concentrated in one of the dissimilar components and the other portion adjacent the cold surface of the slit, i. e., the portion between the cold surface and the center of the slit, becomes more concentrated in another of the dissimilar components of the initial petroleum product. The inlet valve 16 and the outlet valves 17 and 19 are open so that dissimilar fractions that become concentrated at the top and bottom of the slit 11 can be continuously withdrawn by way of outlet ports 21 and 22, respectively.

It is to be understood, of course, that this particular embodiment may be varied considerably without departing from the scope of this invention. Thus, for example, the slit 11 may be provided with a number of inlet ports 10 along its length so that the initial petroleum product can be introduced into the slit at any point at the will of the operator. Similarly, a number of outlet ports such as outlet ports 21', 21'', 22', and 22'', shown in dotted lines can be provided at various points along the length of the slit 11 so that fractions which are separated in unequal volumes may be withdrawn without unduly mixing the fractions in the process of withdrawal or so that fractions of different concentrations can be withdrawn simultaneously or at different times. Furthermore, two outlet ports may be substituted for outlet port 22 at the bottom of the slit and provided with a partition extending a short distance up the slit from the bottom and midway between the two surfaces that form the slit so that one of the outlets will selectively withdraw the fraction that accumulates adjacent the hot surface and the other will selectively withdraw the fraction that becomes concentrated adjacent the cold surface.

The method illustrated by way of example in Fig. 2 involves introducing the petroleum product in the liquid or liquefied state through an inlet port 10 into a narrow tubular slit 11a that is formed by the surfaces 12a and 14a of two concentrically disposed tubes, one of said surfaces being maintained at a higher temperature level than the other. The petroleum product is introduced in the liquid state through valve 16 by way of inlet port 10 into the slit 11a and the fraction tending to concentrate adjacent the hot surface and therefore at the top of the slit is continuously withdrawn through valve 17 and outlet port 21 while the fraction tending to concentrate adjacent the cold surface is continuously withdrawn through valve 19 by way of outlet port 22.

It is to be understood that this embodiment likewise is not limited to that shown specifically in Fig. 2 but that it is capable of numerous variations as explained with reference to the embodiment illustrated in Fig. 1.

In separating the dissimilar components of a petroleum product in the continuous manner, it is necessary only, as far as the location of the feed is concerned, to make certain that the initial liquid will not be withdrawn from the slit before being subjected to thermal diffusion. This may be accomplished by feeding the initial liquid into the slit and withdrawing the hot and cold or top and bottom fractions in any of the various ways described with reference to Figs. 1 and 2.

In the case of a tubular slit, the slit should be substantially vertical. A flat slit may be at any angle or be horizontal. In the latter case there will be no thermal circulation and forced separation of the two layers is necessary.

Any suitable means may be employed to maintain a temperature gradient across the slit. The walls forming the surfaces of the slit are constructed of any solid material and are capable of conducting heat to or from heating or cooling jackets provided to maintain said surfaces at the desired temperatures. Examples are glass and metals such as steel, brass and aluminum. Any source of heat appropriate to the temperature that is maintained at the hot surface may be utilized. Among these are the condensing vapors of steam or other liquids of known boiling points at atmospheric or other pressure, electric heating devices and hot circulating liquids. Similarly, conventional cooling methods may also be employed to keep the temperature of the cold surface at the desired level. Among such methods are air cooling, liquid circulation, vaporizing liquid systems, and other conventional refrigerating means.

It is to be understood that the terms "hot" and "cold" as applied to the slit surfaces, and "heating" and "cooling," as applied to the temperature controlling media, are used in their relative rather than their absolute sense. Thus, for example, the hot and cold surfaces of a slit may be maintained at temperatures of say 160° C. and and 100° C., respectively, or, if the boiling point of the liquid to be subjected to thermal diffusion is low, at temperatures of say 0° C. and −35° C., respectively. The heating media, in such instances, may be steam under pressure, diphenyl vapors, or a boiling mixture of water and ethylene glycol, or it may be ice water. The cooling media, in the examples given may be a vaporizing liquid, such as ammonia, or boiling water.

The more important variables of the method of this invention are the temperature level of the operation, i. e., a mean between the temperatures of the hot and cold surfaces, particularly in relation to the viscosity and boiling points of the petroleum product to be subjected to thermal diffusion, and the rate of feed of the product through the slit. Other variables in the method are the composition of the initial petroleum product, the magnitude of the temperature gradient, the degree of separation desired, the ratio of the rates of withdrawal of the top and bottom fractions and the pressure employed in the operation.

These variables, which are interdependent for the most part, are also dependent upon the following additional variable factors in the apparatus used to carry out the separation: the slit width, i. e., the distance between the hot and cold surfaces of the slit; the slit length, i. e., the effective length of the thermal diffusion section across which a temperature gradient is maintained; the surface area of each slit, i. e., the sum of the products of the length and (in the tube type apparatus) the outside and inside circumferences of the inner and outer tubes, respectively, or (in the plate type apparatus) the lateral extent of each surface of the slit.

The effect these variables have upon one another can readily be determined by one skilled in the art in view of the following general criteria and specific data.

The temperature level of the operation should be such as to reduce the viscosity of the petroleum product to a minimum without disrupting the countercurrent laminar flow of the product or of its components along the surfaces of the slit. The temperature level should also be maintained low enough so as not to reach the boiling point of the petroleum product at the pressure of operation nor should it reach the boiling point of any of the components to be separated. Inasmuch as the method of this invention is essentially a liquid thermal diffusion operation, the temperature level normally should also be maintained high enough to maintain the petroleum product and the separated fractions in the liquid state at the pressure of the operation. In addition, the temperature level must be so chosen as to allow both higher and lower temperatures within the slit to provide a temperature gradient, said higher and lower temperatures likewise being such as not to cause the petroleum product or any component thereof to boil or solidify. Thus, for example, if it is desired to separate normal butane and butene-2, having boiling points at atmospheric pressure of 0.6 and 1° C., respectively, the temperature level of the operation, if it is carried out at atmospheric pressure, should be below 0° C. The maximum temperature, i. e., the temperature of the hot surface, should likewise be below about 0° C. and the minimum temperature, i. e., the temperature of the cold surface, should be above the temperature at which any of the components in the petroleum product would solidify.

The rate of feed of the initial petroleum product through the slit depends upon the degree of separation desired, the difficulty with which the dissimilar components are separated and the turbulence that will be introduced within the slit.

Generally, it may be stated that the degree of separation obtained decreases with an increase in the rate of feed. Where the dissimilar components are difficult to separate, the rate of feed must be decreased until the desired degree of separation is obtained. Furthermore, the maximum rate of feed should not exceed a rate at which turbulence will begin to take place within the slit. This in turn is dependent upon the viscosity of the liquid at the temperature level of the operation, the magnitude of the temperature gradient and the width of the slit. It has been found that at relatively low rates of feed, a higher degree of separation can be obtained in narrower slits but that at higher rates of feed somewhat wider slits give a better separation.

The magnitude of the temperature gradient is more or less directly proportional to the rate of feed, all other factors, including the degree of separation desired, being constant. The lower limit of the temperature gradient is limited only by the minimum rate of feed that is acceptable to the operator because even with a temperature gradient of as little as 1° F., a separation will take place provided the rate of feed is low enough. The maximum temperature gradient that can be employed is limited mainly by the spread between the boiling and freezing temperatures of the petroleum product and its components.

The magnitude of the temperature gradient should not, however, be so great as to induce turbulence within the slit and thereby reduce the efficiency of the separation. In the development of this invention, it has been found that temperature gradients of between 50° and 75° C., while not critical, give excellent results at acceptable rates of feed.

The efficiency of the operation increases more or less directly with an increase in the effective length of the slit. Thus, where a slit has an effective length that is twice that of another slit, the rate of feed through the first slit can be twice that through the second slit without decreasing the degree of separation that is obtained.

The width of the slit, i. e., the distance between the hot and cold surfaces, is generally not greater than about ⅛ of an inch for practical lengths. At greater lengths the slit could be wider. Slit widths within the range of 0.020 to 0.060 inch are preferred for columns of practical lengths. At slit widths below and above this, under given temperature conditions and at optimum feed rates, the degree of separation falls off.

Generally the rate of feed may be increased with an increase in slit width since the linear velocity of flow will decrease with increasing slit width. Furthermore there is less likelihood of turbulence at a given rate of flow in a wide slit than there is in a narrow slit. For a liquid having a viscosity of about 2 centistokes at the operating temperature, the table below gives optimum rates of flow for given ranges of slit width of a column 24 feet long and one inch mean slit diameter:

| Optimum Rates of Flow (cc./hr.) | Slit Width Range (inches) |
|---|---|
| 10 | 0.030–0.035 |
| 20 | 0.032–0.040 |
| 40 | 0.0375–0.047 |
| 60 | 0.040–0.050 |
| 100 | 0.042–0.0505 |
| 130 | 0.042–0.051 |

A great many varieties of liquids have been subjected to thermal diffusion in developing the present invention and the results have been quite surprising. As illustrative of the separation in a vertical slit, naphtha resulted in a top fraction having an impaired knock rating and in a bottom fraction having a slightly improved knock rating. Lubricating oil stock resulted in a top fraction having an improved viscosity index and color and in a bottom fraction having a more intense color and lower viscosity index. A paraffin distillate resulted in a top fraction having an increased viscosity index, an improved color and a concentration of wax and a bottom fraction having a lower viscosity index, poorer color and absence of wax. Cylinder stock resulted in a top fraction having a wax concentration of higher melting point and improved color and a bottom fraction that was asphaltic. Sulfur cutting oil resulted in a top fraction having a decreased optical density and sulfur content and a bottom fraction having an increased color and sulfur content. Catalytically cracked gas oil resulted in a top fraction having an increased concentration of paraffins and a bottom fraction having an increased concentration of aromatics. A mixture of hexadecane and diamyl naphthalene resulted in a top fraction of hexadecane and a bottom fraction of diamyl naphthalene, the two components being completely separated. A mixture of hexadecane and mono-methyl naphthalene likewise resulted in a complete separation, the hexadecane again appearing in the top fraction. A mixture of hexadecane with isopropyl benzene resulted in a top fraction having an increased concentration of hexadecane. A mixture of alpha and beta mono-methyl naphthalene was separated into its alpha and beta isomers, the beta isomer appearing in the top fraction and the alpha isomer appearing in the bottom fraction. A mixture of benzyl alcohol and mono-methyl naphthalene was separated, the mono-methyl naphthalene appearing in the top fraction and the benzyl alcohol in the bottom fraction. An azeotrope of benzyl alcohol and ethylene glycol likewise was separated into its components, the benzyl alcohol appearing in the top fraction and the ethylene glycol in the bottom fraction. 1,2-dimethyl cyclohexane resulted in a top fraction containing an increased concentration of the trans-isomer and in a bottom fraction containing an increased concentration of the cis-isomer. A mixture of normal heptane with benzene resulted in a top fraction having an increased concentration of normal heptane and a lower fraction having an increased concentration of benzene. A mixture of diamyl naphthalene with tetraamyl benzene, toluene with chlorobenzene, n-heptane with triptane, were separated into their respective components, the top fractions being tetraamyl benzene, toluene and n-heptane, respectively. A mixture of heptene-1, heptene-2 and heptene-3 resulted in a top fraction having an increased concentration of heptene-1. A mixture of ortho- and para-xylene and ortho- and meta-xylene resulted in top fractions having increased concentrations of para-xylene and meta-xylene, respectively.

These and other experiments have shown that, as a general rule, when aromatic and non-aromatic components are present in the initial liquid, the aromatic component will tend to concentrate at the bottom, although an exception was found to this rule in the separation of an azeotropic mixture of ethylene glycol and benzyl alcohol, where the aromatic component went to the top.

It is believed, therefore, that aromaticity alone does not determine the direction of flow, but that other factors such as density, coefficient of expansion, specific heat, affect the direction of flow of the components separated by thermal diffusion. In hydrocarbon liquids, bicyclic aromatics have shown a greater tendency to go to the bottom than single membered rings. This rule, however, is likewise not general because it was found that when a mixture of benzyl alcohol and monomethyl naphthalene was subjected to thermal diffusion, the benzyl alcohol, having a greater density and viscosity, went to the bottom whereas the naphthalene went to the top. It is also apparent that generally those components having a lighter color or no color go to the top, whereas those having a dark color go to the bottom.

Without intending to limit in any way the scope of the invention but merely to illustrate more specifically the operation and utility of the method herein described, the following examples are included:

Example 1

A lubricating petroleum oil stock having a viscosity of 300 SUS at 100° F. and an $N_D^{20}$ of 1.5025, referred to by the trade name #300 Red oil, was introduced at a rate of 20 cc./hour into an annular slit formed by two concentric glass tubes, the slit having a width of 0.047 inch, a length of eight ft., and a surface area of two sq. ft. The temperature of the hot surface was maintained at 100° C. by passing steam at atmospheric pressure through a jacket surrounding the outer tube and the cold surface was maintained at 20° C. by circulating tap water through the inner tube. The Red oil was introduced into the slit midway between two outlet ports located at the top and bottom ends of the slit. The separated fractions being removed from said outlet ports at equal rates. The following results were obtained:

|  | Initial Red Oil | Top Fraction | Bottom Fraction |
|---|---|---|---|
| Viscosity Index | 60 | 85 | 27 |
| Optical Density | 411 | 205 | 595 |
| Pour Point, ° C | 37 | 24-28 | 16 |

Example 2

The same Red oil was introduced at a rate of 5 cc./hour into a vertical slit formed by two spaced brass plates, the slit having a width of 0.031 inch, a length of five feet, and a surface area of 1.25 square feet, and the inlet feed being located midway between top and bottom ends of the slit. One surface of the slit was maintained at a temperature of 100° C. and the other at 20° C. The top and bottom fractions were withdrawn at equal rates. The following results were obtained:

|  | Top Fraction | Bottom Fraction |
|---|---|---|
| Viscosity Index | 113 | −22 |
| Optical Density | 60 | 873 |
| Pour Point, ° C | 23-28 | 13-18 |

Example 3

The same Red oil was introduced into the slit described in Example 1 at a rate of 20 cc./hour and the same temperature gradient was maintained across the slit. The top fraction, however, was withdrawn at a rate 15% that of the inlet feed and the bottom fraction was withdrawn at a rate 85% that of the inlet feed. The following results were obtained:

|  | Top Fraction | Bottom Fraction |
|---|---|---|
| Viscosity Index | 93 | 47 |
| Optical Density | 145 | 454 |
| Pour Point, ° C | 45 | 30 |

Example 4

The bottom fraction of Red oil obtained in accordance with Example 3, was again passed through the eight ft. glass column described in Example 1, and the top and bottom fractions through this second pass were removed at equal rates. The following results were obtained:

|  | Top Fraction | Bottom Fraction |
|---|---|---|
| Viscosity Index | 73 | 21 |
| Optical Density | 234 | 645 |
| Pour Point, ° C | 41 | 3 |

Example 5

The Red oil of Example 1 was passed through the eight ft. glass column described in Example 1, but the top fraction was withdrawn at a rate only 5% of the inlet feed rate, whereas the bottom fraction was withdrawn at a rate 95% that of the inlet feed. The following results were obtained:

|  | Top Fraction | Bottom Fraction |
|---|---|---|
| Viscosity Index | 95 | 45 |
| Optical Density | 112 | 496 |
| Pour Point, ° C | 42 | 14 |

Example 6

An annular slit formed by two concentric brass tubes and having a width of 0.0115 inch, a length of two feet, and a surface area of 0.65 square feet, was filled with the same Red oil described in Example 1.

The hot surface of the slit was maintained at a temperature of 150° C. and the cold surface was maintained at a temperature of 100° C. and the Red oil was allowed to stand in the slit for one week. At the end of this time the top and bottom fractions were withdrawn in equal volumes.

It was found upon examination that the top fraction had an $N_D^{20}$ of 1.4870 and that the bottom fraction had an $N_D^{20}$ of 1.5501. This shows that a very short column can be used if the feed rate approaches or is equal to zero.

Example 7

The same Red oil was introduced into an annular slit formed by two concentric tubes and having a slit width of 0.031 inch, a length of six feet, and a surface area of 3.5 square feet. The outer tube was surrounded by a third tube to form a heating jacket and a resistance wire was wound spirally around the outside of said jacket. The Red oil was passed through said heating jacket and fed into the slit midway between the upper and lower ends thereof through a number of small feed holes in the tube forming the outer and hot surface of the slit, the Red oil thus being preheated and, at the same time, serving as a conductor of the heat from the resistance wire to the hot wall of the slit.

The temperature of the hot surface was maintained at between 125° C. and 140° C. That of the cold surface was maintained at 100° C. by passing a circulating boiling water system at atmospheric pressure through the interior of the innermost tube. The top and bottom fractions were removed from the slit at equal rates. The following results were obtained:

| Rate of Feed (cc./hour) | Change in Index of Refraction between Top and Bottom Fractions |
|---|---|
| 130 | .0040 |
| 96 | .0070 |
| 80 | .0080 |
| 50 | .0104 |
| 32 | .0144 |
| 24 | .0188 |
| 12 | .0271 |

*Example 8*

The same Red oil was subjected to thermal diffusion in the apparatus described in Example 7. The hot surface, however, was maintained at a temperature of 150°–165° C. The cold surface was maintained at a temperature of about 115° C. by passing through the interior of the innermost tube a mixture of water and ethylene glycol boiling at that temperature. The results obtained are tabulated below:

| Rate of Feed (cc./hour) | Change in Index of Refraction between Top and Bottom Fractions |
|---|---|
| 132 | .0051 |
| 112 | .0059 |
| 80 | .0080 |
| 60 | .0102 |
| 48 | .0125 |
| 29 | .0182 |
| 18 | .0240 |

*Example 9*

The innermost tube of the apparatus described in Example 7 was replaced by one of smaller outside diameter to form a slit having a width of 0.068 inch. The hot surface of the slit was maintained at 150° C. and the cold surface was maintained at a temperature of 100° C.
The results obtained by passing the Red oil of Example 7 through the slit are tabulated below:

| Rate of Feed (cc./hour) | Change in Index of Refraction between Top and Bottom Fractions |
|---|---|
| 288 | .0040 |
| 176 | .0050 |
| 62 | .0056 |
| 0 | .0098 |

*Example 10*

The same #300 Red oil was introduced into a slit formed by the surfaces of concentric tubes and having a width of 0.022 inch, a length of 24 feet, and a surface area of 12.56 sq. ft. The rate of introduction was not controlled and varied from 10 to 20 cc./hour and the top and bottom fractions were removed from the slit at rates having a 3:2 ratio.

Spot samples were taken at different times from the streams coming off the column. These samples were analyzed for viscosity index and index of refraction. Typical results were as follows:

|  | V. I. | $N_D^{20}$ |
|---|---|---|
| Top | 114.5 | 1.4754 |
| Do | 97.5 | 1.4843 |
| Bottom | −24.2 | 1.5250 |
| Do | −22.6 | 1.5262 |

The top fractions, and especially that obtained at the slower rate of feed, was found to be almost completely colorless.

*Example 11*

A mixture of hexadecane and isopropyl benzene was subjected to liquid thermal diffusion in the slit described in Example 2. The temperature of one surface was maintained at 100° C. and the other at 20° C. When the initial mixture was fed into the slit at the rate of 50 cc./hour and the top and bottom fractions were removed from the slit at equal rates, it was found that a 5.5% separation was effected in a single pass.
The percentage of separation was increased to 22.5% by reducing the rate of feed to 10 cc./hour and lowered to 2% by increasing the rate of feed to 100 cc./hour.

*Example 12*

The same mixture as described in Example 11 was subjected to liquid thermal diffusion in a slit formed by concentric metal tubes, the slit having a width of 0.0238 inch, a length of 24 feet, and a total surface area of 12.56 sq. ft., the temperatures of the hot and cold surfaces being the same as described in Example 11.
It was found that when the initial mixture was introduced into the slit midway between the top and bottom ends at a rate of 50 cc./hour and the top and bottom fractions were withdrawn at equal rates, a 23% separation was obtained. When the rate of feed was lowered to 10 cc./hour, the percentage of separation was increased to 78% and when the rate of feed was increased to 106 cc./hour the per cent of separation was reduced to 11%.
In both Examples 11 and 12, it was also found that the heavier hexadecane, having a molecular weight of 226.25, became concentrated in the top fraction and that the lighter isopropyl benzene, having a molecular weight of 120.15, became concentrated in the bottom fraction. This is one of the many surprising results leading to the conclusion that the results obtained by subjecting liquids to thermal diffusion cannot be predicted on the basis of any knowledge available regarding gaseous thermal diffusion processes and that, consequently, liquid and gaseous thermal diffusion must be considered as completely non-analogous for all practical purposes.

*Example 13*

A mixture of hexadecane and mono-methyl naphthalene having a viscosity of 2,138 centistokes at 100° F. was introduced into two slits formed by the walls of concentric glass tubes, each slit having a length of eight feet and a surface area of two square feet, but one slit having a width of 0.047 inch and the other a width of 0.031 inch. One surface of each slit was maintained at 100° C. and the other was maintained at 20° C. The comparative results at different rates of feed are tabulated below:

| Rate of Feed (cc./hour) | Percentage Separation Obtained with 0.047-inch Slit | Percentage Separation Obtained with 0.031-inch Slit |
|---|---|---|
| 5 | 28 | |
| 10 | 24.5 | |
| 15 | | 50 |
| 20 | 21.5 | 41 |
| 30 | 20 | 30 |
| 40 | | 23 |
| 50 | 18.4 | 20 |
| 55 | 17.8 | 17.8 |
| 70 | | 14.8 |
| 80 | 16.8 | 13.2 |
| 100 | 16.2 | |
| 105 | | 11.5 |

*Example 14*

A light cylinder stock lubricating oil having a viscosity of 17 centistokes at 212° F. and 600 centistokes at 100° F. was introduced, at a rate of 5 cc./hour, into the slit described in Example 1. One surface of the slit was maintained at 100° C. and the other at 20° C.

It was found that although the initial stock flowed quite freely at room temperature, it was necessary to heat the top and bottom take-off ports in order to maintain flow of the top and bottom fractions. The top fraction was lighter in color than the original stock but still relatively dark as compared with lube oil fractions. The bottom fraction withdrawn at an equal rate had the appearance of asphalt but was less viscous. The solidified material from the top fraction was easily dewaxed by treatment with methyl ethyl ketone. The melting point of the wax obtained was found to be 74° C. No difficulty was encountered in crystallizing and filtering the wax.

When the original cylinder stock was treated in exactly the same manner with methyl ethyl ketone, no wax was obtained. This shows that the method of this invention can be used to refine the oil so as to facilitate dewaxing.

*Example 15*

A paraffin distillate having a viscosity of 3.98 centistokes at 212° F. and 29.5 centistokes at 100° F. was introduced at the rate of 20 cc./hour into a slit similar to that described in Example 1. One surface of the slit was maintained at 100° C. and the other was maintained at 20° C. The results obtained after a single pass are tabulated below:

| | V. I. | O. D. | Per cent S |
|---|---|---|---|
| Initial Paraffin Distillate | 84 | 86 | 1.2 |
| Top Fraction | 96 | 56 | 0.79 |
| Bottom Fraction | 58 | 198 | 1.6 |

It was found that the top fraction contained a greater percentage of wax than the bottom fraction.

*Example 16*

Commercial mono-methyl naphthalene, without being mixed with any other component, was introduced into the slit described in Example 2. One surface of the slit was maintained at 100° C. and the other was maintained at 20° C. The initial naphthalene was introduced into the slit at the rate of 5 cc./hour and the top and bottom fractions were withdrawn from the slit at equal rates.

It was found that an essentially pure beta isomer of mono-methyl naphthalene was separated at the top and that all color, along with the alpha isomer, was concentrated in the bottom fraction.

*Example 17*

A sample of sulfur cutting oil concentrate was introduced at a rate of 20 cc./hour into the slit described in Example 1. The hot surface was maintained at a temperature of 100° C. and the cold surface was maintained at a temperature of 20° C. The top and bottom fractions were withdrawn at equal rates.

The following results were obtained:

| | O. D. | Per Cent S |
|---|---|---|
| Top Fraction | 1,076 | 35.7 |
| Bottom Fraction | 1,931 | 43.9 |

*Example 18*

A series of tests was carried out with mixtures of hexadecane and mono-methyl naphthalene to determine the effect of variations in the composition of the initial petroleum product, the position of the feed inlet, the ratio of the rates of withdrawal of the top and bottom fractions, and the rate of feed upon the degree of separation obtained in a given slit.

These tests were carried out with a slit similar to that described in Example 2. One additional inlet port (referred to as the "quarter feed position") was located midway between the center inlet port and the take off port at the bottom of the slit. In each test the hot surface of the slit was maintained at a temperature of 100° C. and the cold surface was maintained at a temperature about 20° C. by the use of steam and tap water.

The results are listed in the table below:

| | Mixture (proportion by volume of hexadecane to monomethyl naphthalene) | Feed Position | Take-off Ratio (top to bottom) | Feed Rate (cc./hr.) | Composition of— | |
|---|---|---|---|---|---|---|
| | | | | | Top Fraction (proportion by volume of hexadecane to monomethyl naphthalene) | Bottom Fraction (proportion by volume of hexadecane to monomethyl naphthalene) |
| 1 | 75:25 | quarter | 3:1 | 20 | 80.5:19.5 | 60.5:39.5 |
| 2 | 75:25 | do | 1:1 | 20 | 85.5:14.5 | 66.5:36.5 |
| 3 | 75:25 | center | 3:1 | 20 | 81.5:18.5 | 61.5:38.5 |
| 4 | 75:25 | do | 1:1 | 20 | 84.5:15.5 | 68.0:32.0 |
| 5 | 50:50 | quarter | 3:1 | 22 | 66.0:34.0 | 28.5:71.5 |
| 6 | 50:50 | do | 1:1 | 20 | 70.5:29.5 | 41.5:58.5 |
| 7 | 50:50 | center | 3:1 | 20 | 66.0:34.0 | 28.0:72.0 |
| 8 | 50:50 | do | 1:1 | 20 | 71.0:29.0 | 37.5:62.5 |
| 9 | 52.5:47.5 | quarter | 3:1 | 114 | 54.0:46.0 | 49.5:50.5 |
| 10 | 52.5:47.5 | do | 1:3 | 102 | 58.0:42.0 | 51.5:48.5 |
| 11 | 52.5:47.5 | center | 3:1 | 102 | 56.5:43.5 | 44.0:56.0 |
| 12 | 52.5:47.5 | do | 1:3 | 108 | 62.0:38.0 | 50.5:49.5 |

These data show that the exact position of the feed is not particularly critical. The data also show that the concentration of hexadecane in the top fraction increases as the top to bottom take-off ratio decreases.

The term "optical density," as used in the present disclosure, represents the standard logarithmic ratio of intensity of an incident ray falling on a transparent or translucent medium to the intensity of the transmitted ray for a sample length of one meter and light of wave length from 5100 to 5500 Angstroms.

Copending application Serial No. 753,200, filed June 7, 1947, describes and claims apparatus suitable for carrying out the method of this invention. Copending application Serial No. 762,746, filed July 22, 1947, claims generically a similar method and a method of separating five species of materials other than petroleum products.

It is to be understood that the method of the present invention is susceptible of innumerable alterations and modifications that will readily occur to those skilled in the art upon reading the present description. All such alterations and modifications are intended to be included within the scope of this invention as defined in the appended claims.

We claim:

1. A continuous liquid thermal diffusion method for separating a petroleum product that is liquid under the conditions of separation and which comprises two dissimilar components that are liquid under the conditions of separation, which comprises continuously introducing said liquid petroleum product into a substantially vertical slit having a width of 0.02 to 0.06 inch which is formed by two smooth surfaces providing a temperature gradient across said slit by maintaining one of said surfaces at a higher temperature than the other, and continuously withdrawing from one part of said slit a fraction containing a greater concentration of one of said dissimilar components and continuously withdrawing from another part of said slit a second fraction containing a greater concentration of another of said dissimilar components, the rate of withdrawal being regulated in relation to the height of said slit and the temperature gradient across it to obtain the desired separation of the dissimilar components and also in relation to the viscosity of the liquid petroleum product at the temperature in said slit so as to maintain a substantially non-turbulent flow of the liquid in the slit.

2. The process of claim 1 in which the two fractions containing the dissimilar components are withdrawn near the top and the bottom respectively of the slit, and the liquid petroleum product is introduced into the slit at a point intermediate with said top and bottom.

3. The process of claim 1 in which the liquid petroleum product is a lubricating oil stock and the fraction withdrawn from the upper portion of the slit has a higher viscosity index than that of said lubricating oil stock.

ARTHUR LETCHER JONES.
EVERETT C. HUGHES.

REFERENCES CITED

The following references are of record in the file of this patent:

UNITED STATES PATENTS

| Number | Name | Date |
|---|---|---|
| 2,017,432 | Bahlke | Oct. 15, 1935 |
| 2,258,594 | Brewer et al. | Oct. 14, 1941 |
| 2,268,134 | Clusius | Dec. 30, 1941 |

OTHER REFERENCES

Korsching et al., Berichte, vol. 73B, pages 249–269 (1940).

Wall et al., J. of Chemical Physics, vol. 8, pages 949–953, Dec. 1940.

Niyogi Chemical Abstracts, vol. 36, 6389 (1942).